July 9, 1957
T. A. ST. CLAIR
2,798,507
THERMOSTAT BELLOWS
Filed Sept. 21, 1953
2 Sheets-Sheet 1
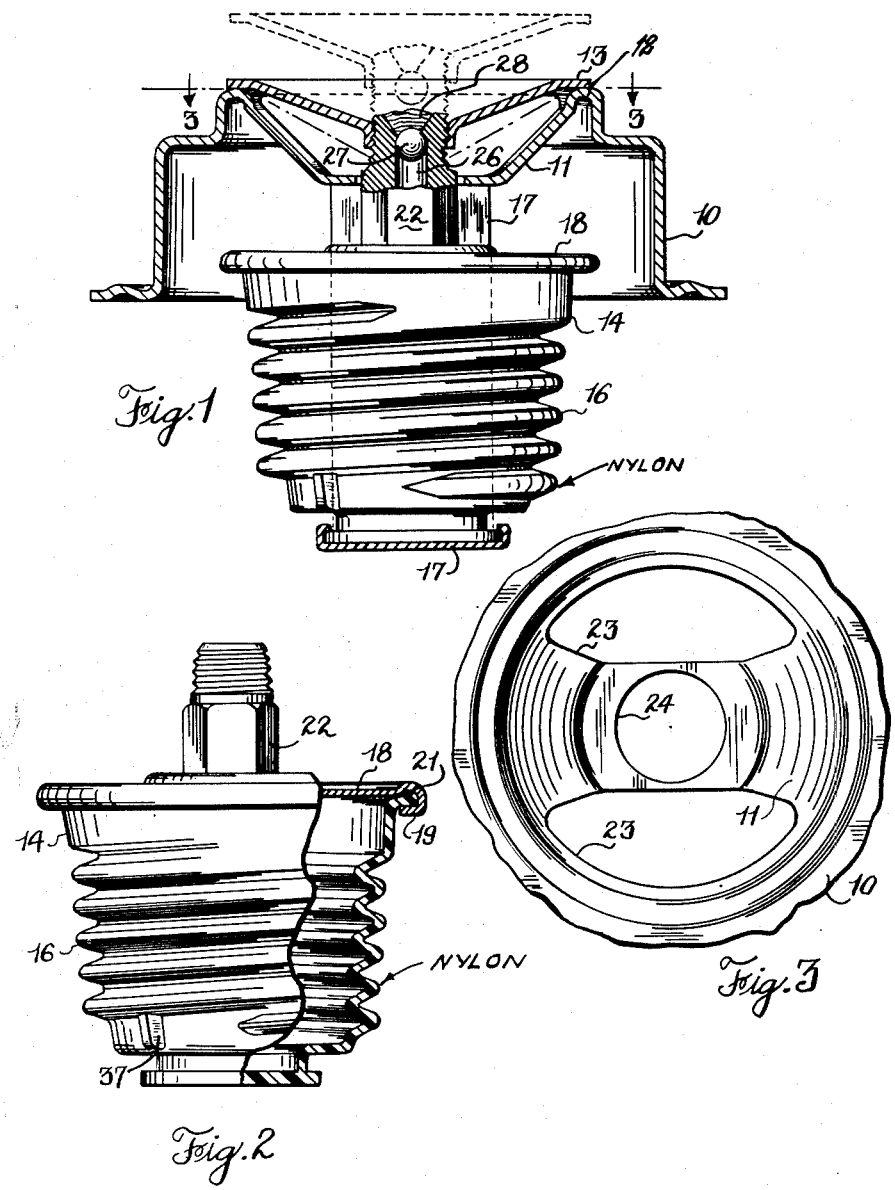
INVENTOR.
THEODORE A. ST. CLAIR
BY
RICHEY, WATTS, EDGERTON & McNENNY
ATTORNEYS July 9, 1957 T. A. ST. CLAIR 2,798,507
THERMOSTAT BELLOWS
Filed Sept. 21, 1953 2 Sheets-Sheet 2

INVENTOR.
THEODORE A. ST. CLAIR
BY
RICHEY, WATTS, EDGERTON & McNENNY
ATTORNEYS

United States Patent Office 2,798,507
Patented July 9, 1957

2,798,507

THERMOSTAT BELLOWS

Theodore A. St. Clair, South Euclid, Ohio, assignor to The Weatherhead Company, Cleveland, Ohio, a corporation of Ohio Application September 21, 1953, Serial No. 381,404

2 Claims. (Cl. 137—796)

This invention relates generally to bellows and more particularly to bellows adapted for use in the automotive thermostats and similar applications.

Prior art bellows generally provide a series of collapsible folds in the side walls of the bellows which permit the bellows to extend and contract axially without stretching the material of the bellows and which also serves to resist radical expansion of the bellows material perpendicular to the desired direction of flexibility. In automotive thermostats for use in controlling the flow of the cooling liquid in the internal combustion engine it has been common to form the bellows of relatively thin metal formed with a series of annular folds or ribs of the side walls. Such bellows are difficult to manufacture and therefore expensive. A great deal of work has been done attempting to reduce the unit cost of such bellows without sacrificing any of the desirable properties. But these attempts have met with little success.

It is a principal object of this invention to provide a bellows which lends itself to low cost high production methods of manufacture and which will provide a long trouble-free service life.

It is another object of this invention to provide a bellows which is adapted for use in automotive thermostats which readily lends itself to low cost high production methods of manufacture.

It is still another object of this invention to provide a method of moulding bellows suitable for use in automotive thermostats or similar applications wherein the bellows is axially expandible and resistant to stresses in all other directions.

It is still another object of this invention to provide a generally cup-shaped bellows having side walls formed with a helical rib or fold.

It is still another object of this invention to provide a generally cylindrical bellows formed of plastic material which is relatively flexible and non-elastic wherein the side walls are formed with a helical rib or fold that permits axial expansion but resists radial stresses.

It is still another object of this invention to provide an automotive thermostat which includes a generally cylindrical bellows formed with side walls having a helical rib or fold therein.

The foregoing and other objects and advantages will become apparent in view of the following description taken in conjunction with the drawings, wherein:

Fig. 1 shows a bellows according to this invention applied to an automobile thermostat;

Fig. 2 is a view partially in cross section disclosing the structure of a bellows according to this invention;

Fig. 3 is a plan view with parts removed along 3—3 of Fig. 1; and

Figure 4:
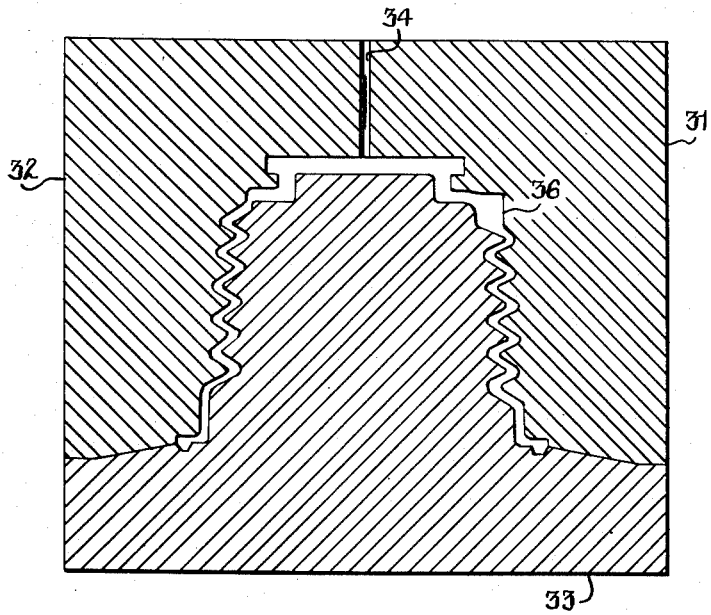
Fig. 4 is a cross sectional view of the preferred form of dies used to mould a bellows according to this invention.

A bellows according to this invention comprises a hollow cylinder formed of flexible material wherein the walls of the cylinder are provided with a helical rib or fold which permits axial deformation of the bellows while resisting radial stresses.

In the preferred embodiment of this invention the bellows is moulded of a flexible material which is relatively non-elastic by injecting the material into a mould cavity formed by a female die having helical convolutions in the side walls and a male die positioned within the female die having similar helical convolutions along its circumferential surfaces. The cavity between the surfaces of the male and female dies is substantially uniform in thickness forming helical convolutions which are relatively deep. The material from which the bellows is moulded is preferably flexible and relatively non-elastic.

It has been found that the material known as nylon effectively serves in this application since it has the physical properties mentioned above and since it is able to withstand the fluids to which the bellows are exposed as well as providing a durable long lasting bellows. Nylon may be described as a high molecular weight straight chain polyamide resulting from the condensation of a diamine and a dibasic acid. This material is described in United States Patent No. 2,216,835.

Referring to Fig. 1 an automotive thermostat according to this invention includes a base or body 10 having a generally cup-shape with a re-entrant end wall 11. The body 10 is provided with an annular valve seat 12 against which the valve member 13 seats when the valve is closed. A cup-shaped bellows 14 provided with helical ribs 16 in the side wall thereof is mounted at its lower end in a bracket 17 which positions the lower end of bellows relative to the valve seat 12. The bracket 17 has a portion extending upwardly securing the bracket to the body 10. The upper end of the bellows 14 is closed by the end plate 18 which is mounted on bellows 14 by spinning the flange 19 around the bead 21 formed at the open end of the bellows. A stem 22 is mounted on the end 18 and is provided with threads which supply means for mounting the valve member 13.

The end wall 11 is apertured at 23 with large apertures to provide for flow through the valve seat when the valve is open. The end wall 11 is also provided with a centrally located aperture 24 through which the stem 22 slides when operated by the bellows. In the preferred embodiment the stem 22 is provided with a through-bore 26 through which thermostat liquid is inserted during the assembly of the thermostat. The through bore 26 is then closed by the ball 27 and is soldered as at 28 thereby permanently sealing the bellows cavity with the liquid therein.

The liquid within the bellows is chosen to provide the desired thermostatic characteristics and must therefore have the desired vapor pressure and boiling point so that the thermostatic valve will be open or closed as the condition demands. When the liquid within the bellows is heated to the proper temperature the vapor pressure thereby developed causes the bellows to expand axially opening the valve. When the liquid within the bellows is cooled the vapor pressure is reduced and the bellows contracts axially thereby closing the valve. Various liquids may be used depending upon the characteristics desired in the thermostat. Among the liquids which can be used is a mixture of methyl alcohol and water or mixtures of isopropyl alcohol and isobutyl alcohol. It should be understood that these liquids are only set forth by way of example and are not intended to limit this invention to their use.

The bellows 14 can be formed as a cup having substantially perpendicular side walls or may as shown in the drawings be formed with a slight taper with the wide portion adjacent to the bead 19. This taper facilitates the removal of the male die from the mould.

In the preferred form of dies the male die is formed with corresponding recessed helical convolutions. Referring to Fig. 4 the female dies 31 and 32 are adapted to be separated. However, it would be within the scope of this invention to form the female die as a single die. The male die 33 projects into the cavity of the female dies and provides the bellows cavity which is generally cup-shaped. The passage 34 is formed at the center of the assembled female dies and provides an opening into which the material being molded is inserted into the dies. The female dies are preferably formed with a substantially radially projecting cavity 36 which results in the lug or ear 37 on the bellows. This ear prevents the rotation of the bellows with the male die as the male die is threaded out of the bellows. The method of molding the bellows according to this invention is quite simple and merely requires the injection of the material to be molded into the assembled dies. After the material has solidified in the dies the male die is rotated causing the male die to be withdrawn along the helical convolutions after which the female dies may be separated and the bellows removed.

Those skilled in the art will understand that by utilizing the structure disclosed it is possible to mold bellows which are axially expandible of relatively non-elastic materials since it is not necessary to remove the moulded bellows over the ribs and it is not necessary to provide a collapsible male die. Although the bellows according to this invention is particularly well adapted for use in automotive thermostats it should be understood that this bellows could be used in other applications wherein axial flexibility is desired along with relative radial rigidity.

Having completed a detailed description of the preferred embodiment of the present invention so that others skilled in the art may be able to understand and practice the same, I state that what I desire to secure by Letters Patent is not limited by said preferred embodiment but rather is defined by what is claimed.

What is claimed is:

1. A bellows unit for a thermostat comprising a metal disc having an inturned peripheral flange at one side thereof, a tubular metal stem secured to and projecting from the other side of said disc, a molded cup-shaped member having a peripheral bead formed at the open top thereof, said peripheral bead disposed within and secured to said disc by means of said inturned flange, said cup-shaped member being formed throughout of a molded high molecular weight straight chain polyamide, said cup-shaped member being generally conical and tapered from a maximum diameter at said peripheral bead to a minimum diameter at the bottom wall thereof, the side walls of said cup member being formed to provide a spiral groove winding about the central axis of the bellows unit and the bottom wall of said cup member having a circular portion provided with a peripheral bead to facilitate anchoring of the bellows unit in the thermostat.

2. A bellows unit for a thermostat comprising a cup-shaped member of molded nylon and a metal disc having a tubular stem secured thereon and projecting axially therefrom, said disc having an inturned flange on the side thereof opposite said stem, said cup-shaped member having an open top and a closed integrally molded bottom wall, the side walls of said cup member being generally conical and sloping from a maximum diameter at the open top to a minimum diameter at the bottom wall, the side walls of said cup member being characterized by a spiral groove winding about the axis of the cup, the bottom wall of said cup member having a peripheral bead at the exterior of the cup for mounting the bellows unit in the thermostat and the top edge of said nylon cup member having a peripheral bead adapted to be clamped to said disc by said inturned flange.

References Cited in the file of this patent

UNITED STATES PATENTS

| | | |
|---|---|---|
| Re. 17,228 | Levy | Mar. 5, 1929 |
| Re. 19,000 | Scribner | Nov. 14, 1933 |
| 184,461 | Cooper | Nov. 21, 1876 |
| 1,675,698 | Dienner | July 3, 1928 |
| 2,049,100 | Baker | July 28, 1936 |
| 2,132,290 | Dube | Oct. 4, 1938 |
| 2,216,835 | Corothers | Oct. 8, 1940 |
| 2,304,828 | Joy | Dec. 15, 1942 |
| 2,324,173 | Porter | July 13, 1943 |
| 2,372,011 | Remington | Mar. 20, 1945 |
| 2,558,026 | Wilson | June 26, 1951 |
| 2,609,596 | Clark | Sept. 9, 1952 |

OTHER REFERENCES

Nylon Moulding Powders, pp. 1–4; published by Poly Chemical Department of Du Pont Company, Wilmington, Delaware; received in the United States Patent Office, September 21, 1953.